United States Patent [19]

Hull et al.

[11] Patent Number: 4,947,576
[45] Date of Patent: Aug. 14, 1990

[54] FISH HOOK DISGORGER

[76] Inventors: Harold L. Hull, 401 Canyon Way, Sp. 43, Sparks, Nev. 89434; Donnell J. Ekins, 4540 River Haven Dr., Reno, Nev. 89909

[21] Appl. No.: 328,633

[22] Filed: Mar. 27, 1989

[51] Int. Cl.⁵ .................................... A01K 97/00
[52] U.S. Cl. ................................................ 43/535
[58] Field of Search .................................... 43/535

[56] References Cited

U.S. PATENT DOCUMENTS

| | | | |
|---|---|---|---|
| 2,455,013 | 11/1948 | Klinicki | 43/53.5 |
| 2,469,699 | 5/1949 | Mundy | 43/53.5 |
| 2,519,098 | 8/1950 | Aye | 43/53.5 |
| 2,670,561 | 3/1954 | Howorth et al. | 43/53.5 |
| 2,967,373 | 1/1961 | Garrison | 43/53.5 |
| 2,984,931 | 5/1961 | Shaw | 43/53.5 |
| 3,132,438 | 5/1964 | Ward et al. | 43/53.5 |
| 3,334,437 | 7/1964 | Sawyer | 43/53.5 |
| 3,377,735 | 4/1966 | Daughtry | 43/53.5 |
| 3,434,231 | 9/1966 | King | 43/53.5 |
| 3,713,243 | 1/1973 | Tetzner | 43/53.5 |
| 4,006,554 | 2/1977 | Tice et al. | 43/57.5 |
| 4,014,130 | 3/1977 | Roberts | 43/53.5 |
| 4,028,825 | 6/1977 | Tetzner | 43/53.5 |
| 4,068,400 | 1/1978 | McCoy | 43/53.5 |
| 4,342,171 | 8/1982 | Cripps et al. | 43/53.5 |
| 4,473,966 | 10/1984 | Neal | 43/53.5 |
| 4,674,220 | 6/1987 | Bearce | 43/4 |

*Primary Examiner*—M. Jordan

[57] ABSTRACT

A device for disgorging a fish hook attached to a line from a fish which has various adaptable knobs for various size fish hooks with the knobs being rotatable to lock the line into the knob to hold and secure the fishing line while using the device. The device may also contain a mechanism which removes the slack of the line between the device and the fish hook allowing the fishermen to use one hand to hold the fish while working or walking the device down the line with the other hand to engage the hook and then securely lock the line into the device for easy removal of the hook and line from the fish's mouth.

21 Claims, 3 Drawing Sheets

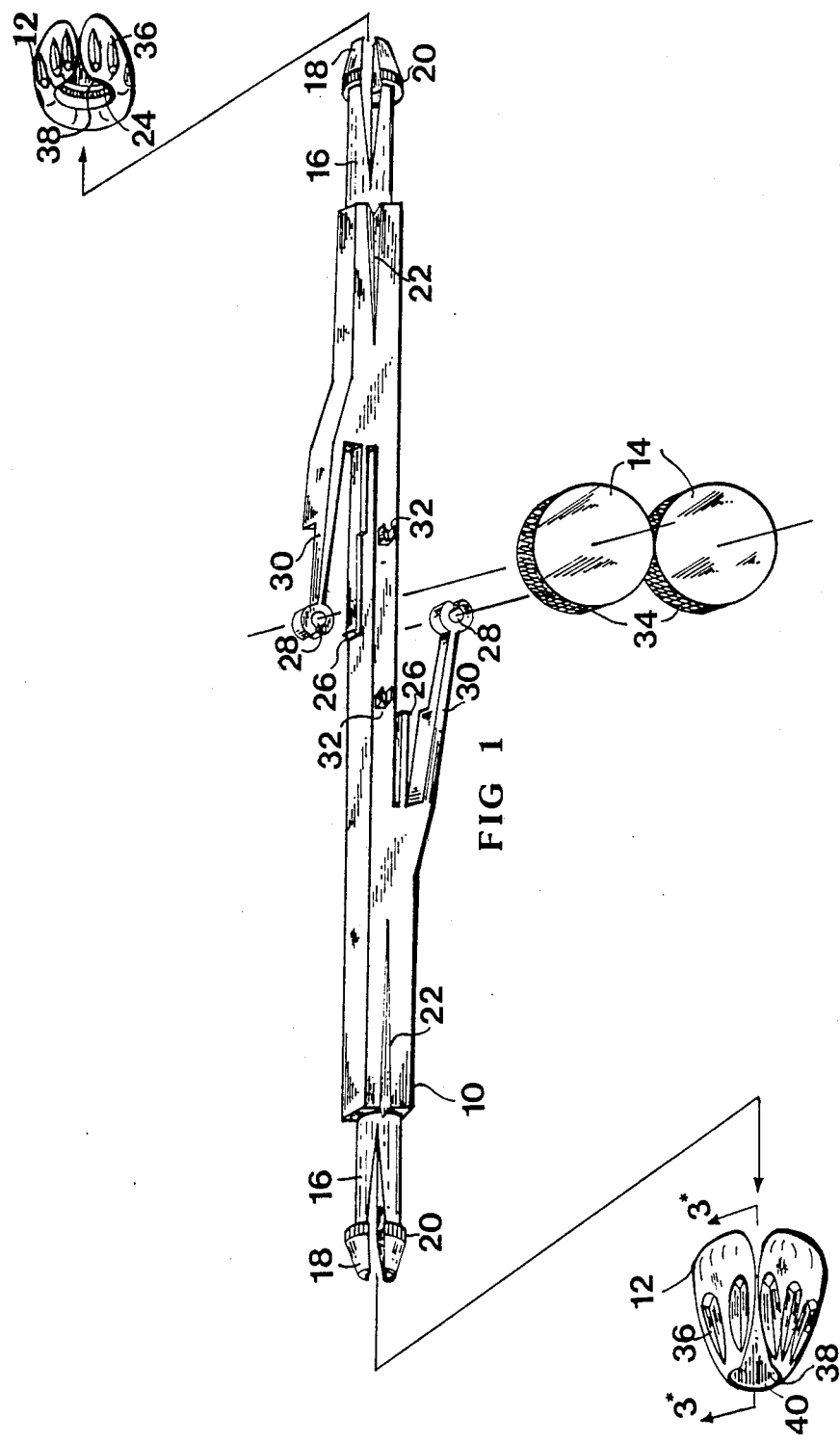

FISH HOOK DISGORGER

FIELD OF THE INVENTION

This invention relates to means to remove a fish hook and line from the throat of a fish and means to remove the slack of the line between the hook and the device.

BACKGROUND OF THE PRIOR ART

A number of devices have been proposed and taught by the prior art involving pliers, pinchers, hook-shaped probes, clutches to tighten on the hook, spring-loaded line followers, etc. Although the prior art shows a number of devices that work, most of them are bulky, complicated and expensive to manufacture.

The device of the present invention is somewhat similar to that described in U.S. Pat. No. 3,377,735 and U.S. Pat. No. 2,519,098 but has been developed as a modification of and an improvement upon these patented devices.

While the devices of the patents above referred to have proved capable of being utilized somewhat satisfactorily in the manner described in the said patents, in actual use by the inventors, it has been found that they provide no means to lock the line into the device when sliding the device down the line, or means to lock the line to the device when removing the hook and line from the fish. Also, no means is provided to remove the slack in the line between the device and the hook when sliding the device down the line.

SUMMARY OF THE INVENTION

It is a primary object of the invention to provide a fish hook disgorger comprising a shaft member, a fishing line engaging and disengaging member, means for receiving and retaining a hook and line locking means.

It is a further object of the present invention to provide a device for removing a fish hook, along with its line or leader attached, from the inside of a fish in such a manner as to lock the hook and line or leader into the device, so that full attention may be given to holding the fish and removing the hook.

Another object is to provide a fish hook remover that has multiple size knobs available which may be removably mounted on each end to accommodate various size hooks and for various size fish.

Yet another object is to provide a fish hook remover whereby the knob engaging the fish hook is rotatable on the shaft member so that when the fishing line is placed into the interior chamber of the knob, the knob can be rotated to disalign the slit in the knob with the guide means on the shaft member thus capturing the fishing line in the interior chamber of the knob.

Still another object is to provide a fish hook remover that slips over the line, then locks into place over the line so that the line cannot come out of the device as the device is slipped down the line into the fish's mouth and engages the hook.

Yet another object and advantage in a second embodiment is to provide a fish hook remover that after the device has engaged the hook, the line may be easily and quickly secured to the knob on the distal end of the device, thus making the hook, line, and device one homogeneous member.

Still another object is to provide a knob with a slit smaller than the line or leader, but through which the line or leader can be forced to allow the line or leader to be contained in the interior chamber of the knob, with the knob being made of a material having a memory or other means to return to a closed position.

Another object is to provide the various knobs in various colors for identification or aesthetic value.

Yet another object is to provide a device that has means to remove the slack from the line between the device and the hook as the device moves down the line.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a perspective, exploded view of the entire device.

FIG. 2 is a side view of the device drawn at a smaller scale.

FIG. 3 is a side view but with the device rotated at 90 degrees to FIG. 2.

FIG. 4 is a fragmentary, sectional view of the end rotatable knobs of FIG. 1.

FIG. 5 is an end elevation taken on the line indicated at 5*—5* of FIG. 4.

FIG. 6 is a section taken at 6*—6* of FIG. 3 drawn to a larger scale.

FIG. 7 is a second embodiment eliminating the section 8*—8* of FIG. 3 drawn to a larger scale.

FIG. 8 is a section taken at 8*—8* of FIG. 3 drawn to a larger scale.

FIG. 9 is a side view of a third embodiment.

FIG. 10 is a side view of the third embodiment with the device rotated at 90 degrees to FIG. 9.

FIG. 11 is a section taken at 9*—9* of FIG. 9 drawn to a larger scale.

FIG. 12 is an end elevation taken on the line indicated at 17*—17* of FIG. 10.

FIG. 13 is a section taken an 19*—19* of FIG. 7 taken to a larger scale.

FIG. 14 is a sectional view of the interior chamber of a fixed or rotatable knob such as in FIGS. 1–5,7,9–13 and showing the hook and line in place and drawn to a larger scale.

FIG. 15 is a reversed side view of the section 8*—8* of FIG. 3 drawn to a larger scale.

FIG. 16 is a partial view of the third embodiment of FIG. 9 showing an end with a line locking system drawn to a larger scale.

FIG. 17 is a partial view of the third embodiment of FIG. 9 showing an end with a line locking system but rotated at 90 degrees to FIG. 16.

FIG. 18 is an end view of FIG. 16.

DETAILED DESCRIPTION OF THE DRAWINGS

Referring now to the drawings in detail with like numerals designating like parts in the different views, 10 is a central shaft or stem member while 12 are rotatable knobs, 14 being thumb-activated knobs and 16 being split shaft sections with 18 being tapered connections and 20 being outside detents with 22 being tapered grooves and 24 being inside indents while 26 are cantilevered ratchet arms and 28 being split collars and bearings with 30 being cantilevered arms while 32 are leader or line guides with 34 being serrated surfaces and 36 are V-shaped grooves with 38 being rounded, tapered slits or gaps with 40 being interior chambers and 42 being ratchet wheels and 44 being shoulders with 46 being fixed knobs with 48 being tie-down notches for the fishing line with 50 being slits or gaps smaller than the fishing line and 56 are threads for the rotatable knobs 12 with 52 being a fish hook and 54 a fishing line, while 58 is a raised boss or section to provide a means to hold the fishing line when wound on the fixed knob 46 through the slit 50 and notch 48 and 59 is a means to cause tension on slit 50, while 60 is an additional means to provide tension to close slit 50 such as a metal slip-ring.

OPERATION

When the device is fully assembled as shown in FIG. 2 with the rotatable knobs 12 assembled at each end of the device, and the thumb-activated knobs 14 inserted into the bearings 28 and held in place by cantilevered arms 30 while also engaging cantilevered ratchet arms 26 (this being the preferred embodiment), the device is ready for use.

When a fish is caught and the hook is embedded in the fish's mouth or stomach, the device of the present invention is held in one hand while the fish may be held with the other or left lying in a net or the like, the line or leader protruding from the fish's mouth is engaged by slipping said line through the slit 38 of the rotatable knob 12, (which is in alignment with tapered groove 22), then through the tapered groove 22 and over line guide 32 and then inserted between the two thumb-activated knobs 14 into the serrated surfaces 34 which holds the line in a secure manner because the thumb-activated knobs 14 cannot turn as they are locked by ratchet wheels 42 and cantilevered ratchet arms 26. Also, at this time rotatable knob 12 is rotated or turned until the tapered, rounded slit or gap 38 is out of alignment with V-shaped groove 22, thus securely locking and capturing the leader or line into the interior chamber 40 of rotatable knob 12.

Now, with the thumb of the hand holding the device, the thumb-activated knob on the thumb side of the device is pressed toward the stem member 10, which disengages the bottom ratchet 42 from the cantilevered arm and ratchet 26. The device, being made of plastic or the like, is resilient. Said resiliency in said cantilevered arms 26 and 30 create pressure between the said thumb-activated knobs 14 and said ratchet assembly 42. This position of the thumb-activated knobs 14 allows the thumb to rotate the thumb-activated knobs 14 in a forward, rotating motion which pulls or walks the fishing line or leader through the thumb-activated knobs 14, thereby shortening the distance of the line or leader between the device and the hook. With repeated action of the thumb, the device travels or walks its way into the fish's mouth until the shank of the hook is engaged in the interior chamber 40 and the point of the hook rests and is protected in one of the tapered grooves 36. Now the hook and line or leader is locked securely in the device by the said pressure between the said thumb activated knobs and/or by wrapping the line around the thumb-activated knobs 14 as demonstrated by FIG. 15, and cannot come loose while the fisherman pushes or pulls on the device to remove the hook from the fish.

To disengage the hook and line from the device, the tapered, rounded slit or gap 38 of rotatable knob 12 is again aligned with tapered groove 22, and with the line removed from in between the thumb-activated knobs 14, the hook and line are once again free.

The second embodiment as shown by FIG. 7 may have the rotatable knobs 12 releasably mounted to the central shaft or stem member 10 by means of threads 56 as shown in FIG. 13 and the center portion as shown by FIG. 8, eliminated. The rotatable knobs 12 of this embodiment lock the line into the interior chamber 40 as demonstrated by the preferred embodiment and may also be locked at the distal end between the shoulder 44 and rotatable knob 12 by threads 56.

Also, a third embodiment is shown in FIGS. 9, 10, 11 and 12 which shows a fixed knob 46 and eliminates the center portion as shown by FIG. 8. The ends of this embodiment have slits or gaps 50 which are narrower than the diameter of the fishing line so that the line may be forced through the said slit 50 into the interior chamber 40 as illustrated by FIG. 12.

Also FIGS. 9, 10 and 11 show a notch 48 which provides a means to lock the line by winding several loops of the line through the slit or gap 50 and around the notch 48.

Also FIGS. 16, 17 and 18 show a line engaging and disengaging system which allows the fishing line to be inserted forcefully through slit 50 into the interior chamber 40 and the fixed knob 46 being made of material with resiliency, causes the slit 50 to again close to its closed position capturing the fishing line in the interior chamber 40. Also, the knob 46 may be relieved by means 59 to cause tension on the slit 50. Also other tensioning means are shown by slip-ring 60.

It will now be seen that we have provided a versatile and valuable device, which may be made of plastic by injection molding or the like, which is economical to manufacture, and which performs a valuable service to fisherman in a manner heretofore not provided, as said device will allow the fisherman to hold the fish with one hand and with the other hand work the device down the fishing line into the fish's mouth, to the hook, and disgorge the hook in a safe manner that leaves the fish, the hook, the line and the fisherman in a satisfactory and desirable condition.

Although the invention has been herein shown and described in what is conceived to be the most practical and preferred embodiments, it is recognized that departures may be made therefrom within the scope of the invention, which is not to be limited to the details disclosed herein but it is to be accorded the full scope of the claims so as to embrace any and all equivalent devices and apparatus.

Having described our invention, what we claim as new and desire to secure by Letters Patent is:

1. A fish hook disgorger comprising; a shaft member, fishing line engaging and disengaging members, means for retaining a hook, line locking means, said engaging and disengaging members being first and second knobs mounted at a first and second ends of said shaft, said knobs being hollow and having an interior chamber open at a first end and open at a second end of said knobs, said knobs having longitudinal slits extending along a side of said knobs and for the entire length of said knobs and opening into said knob chambers, said slits having a longitudinal center line extending in the same plane as the center line of a first and second groove beginning near a first and second end of said shaft member providing fishing line guide means, said grooves leading into said line locking means, said slits increasing longitudinally from a longitudinal center of said slits to a first end of said slits and to a second end of said slits, said slits having a first and second position said first position being closed with said second position being open, said second position being accomplished by the insertion of a fishing line, and said slits returning to said first position when said fishing line is captured in said interior chamber.

2. The device of claim 1 whereby said first and second knobs are made of material with resiliency.

3. The device of claim 1 in which said first and second knobs have independent means to provide resiliency.

4. The device of claim 3 whereby said independent means to provide resiliency is accomplished by having said first and second knobs surrounded by an independent, open slip-ring, said slip-ring being resilient with said opening in said slip-ring being positioned at said openings of said slits on said first and second knobs.

5. The device of claim 3 whereby said independent means to provide resiliency is accomplished by having two adjacent sides of said slits being independent of said knobs except at one of their ends with their distal ends being free.

6. The device of claim 1 with the addition of means for dis-aligning said fishing line guide means on said shaft member with said engaging and disengaging members, said engaging and disengaging members being rotatably mounted knobs.

7. The device of claim 6 whereby said knobs have a first and a second end, said first end being smaller than said second larger end.

8. The device of 7 whereby said rotatably mounted knobs are rotatably mounted at their said larger second end which is frictionally engaged with said first and second end of said shaft member, said shaft member having mating shoulders on said first and second ends of said shaft members with said mating shoulders being split, thus providing tension between said pair of mating shoulders, with said splits extending sufficiently into the body of said shaft member to provide tension.

9. The device of claim 8 whereby the inner shoulders of said first and second knobs contains identical, adjacent indents and the mating exterior shoulders on said first and second ends of said split shaft members contain identical, adjacent detents, said indents and said detents mating to provide multiple stop positions.

10. The device of claim 1 whereby said first and second knobs are of different sizes.

11. The device of claim 1 with the addition of line slack removing means.

12. The device of claim 11 whereby the line slack removing means are two engaging thumb-activated, rotatable knobs, said thumb-activated rotatable knobs, having mounting means on said shaft and being tensioned toward each other.

13. The device of claim 12 whereby said mounting and said tensioning means are cantilevered arms having resiliency and affixed to said shaft member, with said arms at their distal ends containing bearings to receive shafts affixed to the center of said thumb-activated knobs.

14. The device of claim 13 further comprising line securing means.

15. The device of claim 14 whereby the line securing means are ratchet wheels affixed to said shafts of said thumb-activated knobs, said ratchet wheels being engaged by respective tensioned cantilevered arms, said arms having resiliency and protruding from said shaft member with their distal ends mating with said ratchet wheels to allow said ratchet wheels to turn in one rotational direction only when either one of said ratchet wheels, respectively, are disengaged.

16. The device of claim 12 further comprising fishing line guide means, said fishing line guide means being raised members on said shaft member so situated as to guide said fishing line into a near center position between said two engaging thumb-activated, rotatable knobs.

17. The device of claim 12 whereby said thumb-activated rotatable knobs have serrations on the surfaces that are in contact with each other.

18. The device of claim 1 whereby said first and second knobs on the surface of their outside diameter portions are formed with a series of identical, adjacent, V shaped grooves extending to the outer end of said knobs and causing this portion of said knobs to present identical slightly converging longitudinally extending spaced teeth.

19. The device of claim 1 whereby a section of the center portion of said shaft member is formed with parallel flat surfaces extending longitudinally along said shaft member and perpendicular to the plane of said center line of said first and second grooves.

20. The device of claim 1 with means to hold the fishing line when wound on said knobs, said means to hold said fishing line being a raised boss.

21. The device of claim 20 further comprising a notch and a groove on said knobs to retain, guide and hold said fishing line when wound on said knobs.

* * * * *